(12) United States Patent
Shi

(10) Patent No.: US 8,055,312 B2
(45) Date of Patent: Nov. 8, 2011

(54) PORTABLE ELECTRONIC DEVICE

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 430 days.

(21) Appl. No.: 12/396,542

(22) Filed: Mar. 3, 2009

(65) Prior Publication Data
US 2010/0124950 A1 May 20, 2010

(30) Foreign Application Priority Data

Nov. 19, 2008 (CN) .......................... 2008 1 0305636

(51) Int. Cl.
*H04B 1/38* (2006.01)
(52) U.S. Cl. ...................... 455/573; 455/572; 455/575.1
(58) Field of Classification Search ......................... None
See application file for complete search history.

(56) References Cited

U.S. PATENT DOCUMENTS

| 7,486,044 B2 * | 2/2009 | Patino et al. ................. 320/103 |
| 7,923,963 B2 * | 4/2011 | Sato .............................. 320/101 |
| 2009/0007958 A1 * | 1/2009 | Ho et al. ....................... 136/245 |

* cited by examiner

*Primary Examiner* — Anh Tran
(74) *Attorney, Agent, or Firm* — Altis Law Group, Inc.

(57) ABSTRACT

A portable electronic device includes a battery and an electricity generating device. The electricity generating device includes at least one solar receiving board, at least one controller, a voltage transducer and an accumulator. The solar receiving board is mounted on the outer surface of the portable electronic device to absorb solar energy and convert solar energy into electric energy. The controller is electrically connected with solar receiving board and the voltage transducer to control the electricity generating device. The voltage transducer electrically connected with the controller to transduce the voltage of the generated electricity into a voltage suitable for operating the portable electronic device. The accumulator stores the electric energy and charges the battery when the electrical quantity of the battery becomes low.

12 Claims, 6 Drawing Sheets

PORTABLE ELECTRONIC DEVICE

BACKGROUND

1. Technical Field

The exemplary disclosure generally relates to a portable electronic device, and particularly to a portable electronic device with a self-charging function using solar energy.

2. Discussion of the Related Art

With the development of wireless communication and information processing technologies, sliding portable electronic devices such as mobile phones and personal digital assistants (PDAs) are now in widespread use, and consumers may now enjoy the full convenience of high technology products almost anytime and anywhere.

The portable electronic device usually includes a battery for supplying power. However, batteries are easily run down over a period of time after heavy usage and need to be charged by a charging device or replaced with a charged battery. In the conditions where electric outlets, charging devices and charged batteries are unavailable, power cannot be supplied to the portable electronic devices, thus cause inconvenience to the users.

Therefore, there is room for improvement within the art.

BRIEF DESCRIPTION OF THE DRAWING

Many aspects of the present portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION OF THE EMBODIMENT

Figure 1:
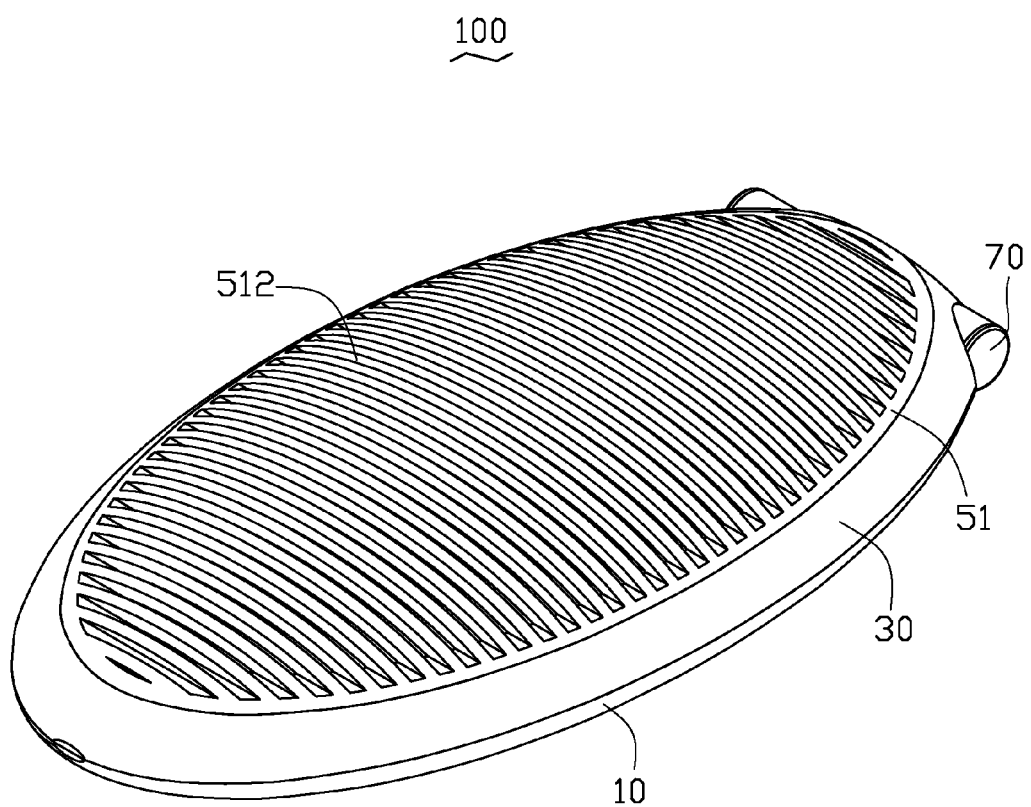
FIG. 1 shows a schematic, perspective view of a portable electronic device, according to an exemplary embodiment.
Figure 2:
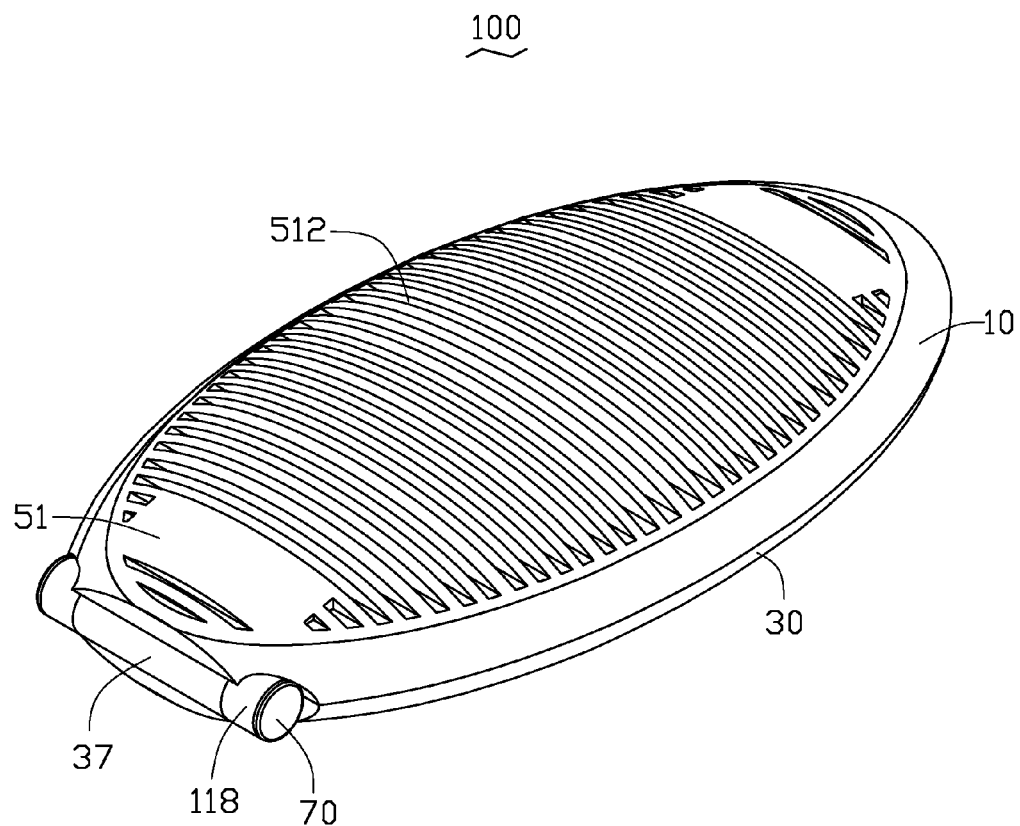
FIG. 2 is similar to FIG. 1, but viewed from another aspect.
Figure 3:
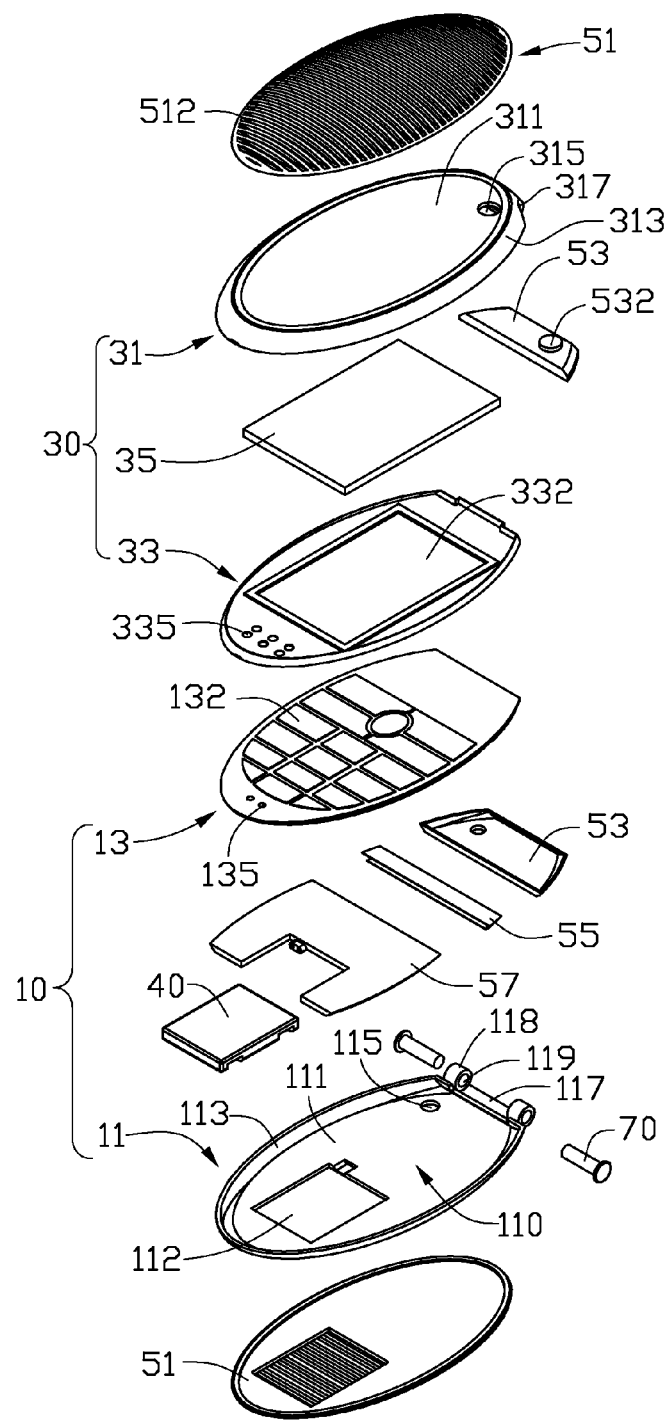
FIG. 3 shows a disassembled perspective view of the portable electronic device in FIG. 1.

Referring to FIG. 1-3, in the present embodiment, the portable electronic device 100 is a flip type portable electronic device. The portable electronic device 100 includes a main body 10, a cover 30, a battery 40, an electricity generating device 50 (shown in FIG. 5) and a hinge device 70.

The main body 10 includes a lower housing 11 and a keyboard assembly 13 mounted on the lower housing 11. The lower housing 11 includes a lower wall 111 and a frame 113 extending from the peripheral edge of the lower wall 111. The lower wall 111 and the frame 113 together form an assembling space 110 to accommodate and assemble the keyboard assembly 13 and electricity generating device 50 therein. The lower wall 111 includes a battery assembling portion 112 recessed therefrom for accommodating a battery 40. In the present embodiment, the lower wall 111 includes a notch defined therethrough to form the battery assembling portion 112. One end of the lower wall 111 includes a first hinged portion 117 for rotatablely hinging with the cover 30. In the present embodiment, the first hinged portion 117 includes two hinge barrels 118. The two hinge barrels 118 each defines a hinged axial hole 119. The lower wall 111 defines a through hole 115 adjacent the first hinged portion 117. The keyboard assembly 13 is mounted on the lower housing 11 and accommodated within the assembling space 110 of the lower housing 11. The keyboard assembly 13 includes a plurality of functional keys 132 and a microphone 135 disposed thereon.

Figure 4:
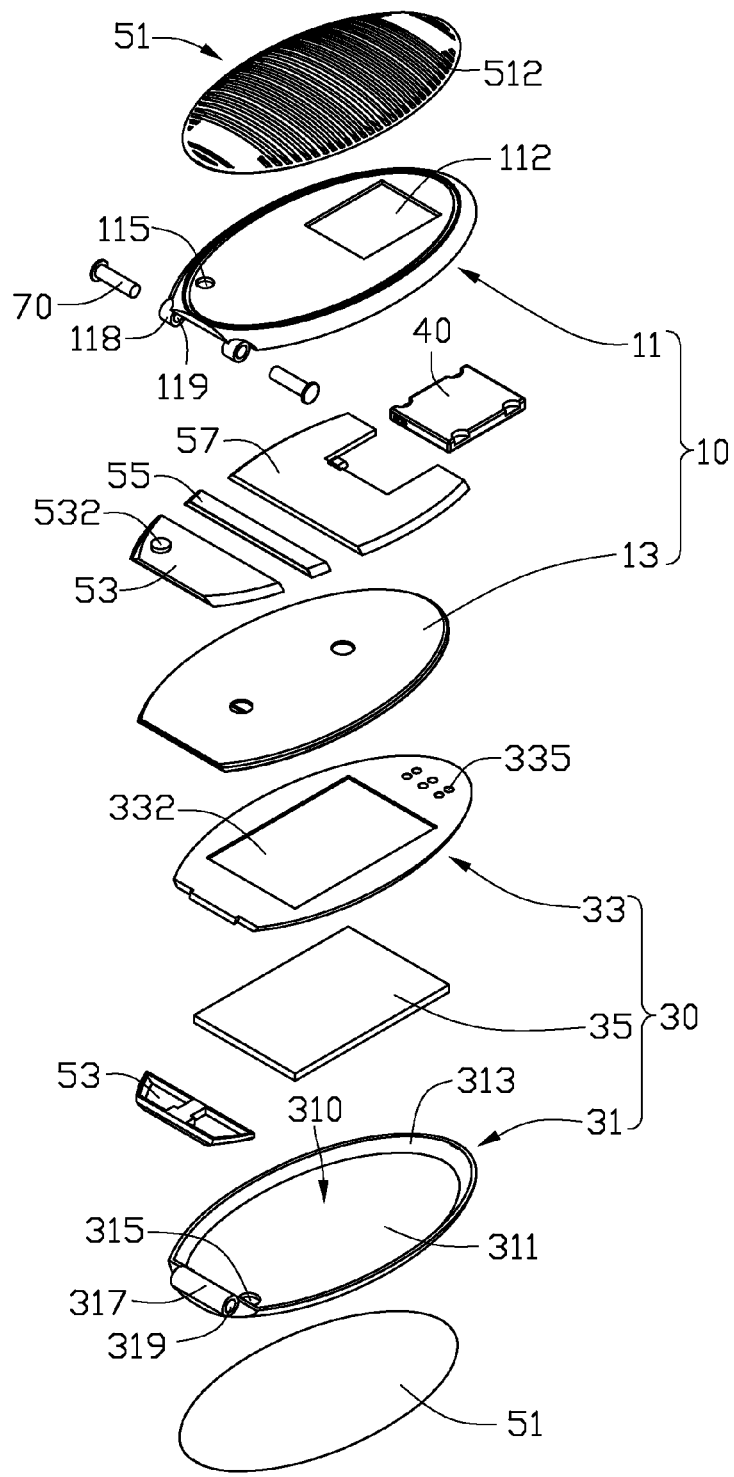
FIG. 4 is similar to FIG. 3, but viewed from another aspect.

Also referring to FIG. 4, the cover 30 includes an upper housing 31, a panel 33 and a display screen assembly 35. The upper housing 31 includes an upper wall 311 and a frame 313 extending from the edge of the upper wall 311. The upper wall 311 and the frame 313 together form an assembling space 310 to accommodate and assemble the display screen assembly 35 and the panel 33 therein. The upper wall 311 includes a second hinged portion 317 disposed at one end thereof corresponding to the first hinged portion 117 of lower housing 11 for being rotatablely hinged with the main body 10. In the present embodiment, the second hinged portion 317 includes a through hole 319 defined axially therethrough. The upper wall 311 defines a through hole 315 therethrough adjacent the second hinged portion 317. The panel 33 is mounted on the upper housing 31 and accommodated within the assembling space 310 of the upper housing 31. The panel 33 includes a display window 332 and an earpiece 335 disposed thereon. The display screen assembly 35 is assembled within the assembling space 310 corresponding to the display window 332 of the panel 33.

Figure 5:
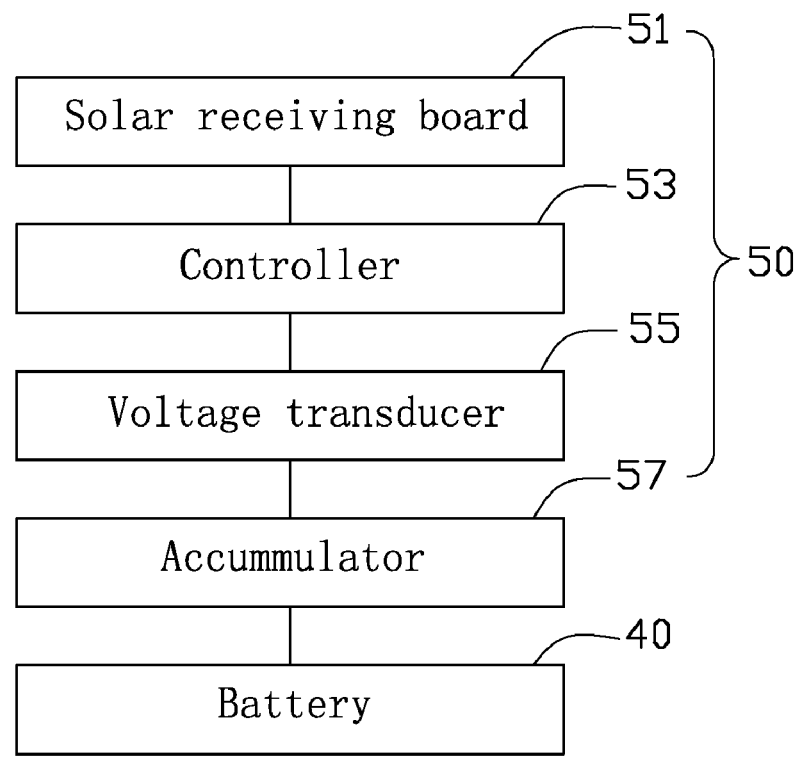
FIG. 5 is an operating principle block diagram of the electricity generating device of the portable electronic device.

Also referring to FIG. 5, the electricity generating device 50 generate electricity by receiving solar energy and converting solar energy into electric energy to power the portable electronic device 100. The electricity generating device 50 includes two solar receiving boards 51, two controllers 53, a voltage transducer 55 and an accumulator 57. The two solar receiving boards 51 are two silicon single crystal boards. The two solar receiving boards 51 are mounted on the outer surface of the lower housing 11 of the main body 10 and the outer surface of the upper housing 31 of the cover 30, respectively. The solar receiving boards 51 absorb sunlight to induce a photoelectric effect that generates electricity. In the present embodiment, the outer surface of the solar receiving boards 51 include a plurality of spaced-apart and parallel raised lines 512 protruding therefrom.

The two controllers 53 are assembled within the lower housing 11 of the main body 10 and the upper housing 31 of the cover 30, respectively. The two controllers 53 electrically connect with the two solar receiving boards 51, respectively, to control the electricity generating device 50. Each controller 53 includes a connecting pole 532 protruding therefrom to electrically connect with the corresponding solar receiving board 51. The voltage transducer 55 is assembled between the controller 53 and the accumulator 57 and electrically connects with the two controllers 53 and the accumulator 57, to transduce the voltage of the generated electricity into the suitable voltage for the portable electronic device 100. The accumulator 57 electrically connects with the battery 40 and store the electricity energy transduced by voltage transducer 55 and automatically charge the battery 40 when the electrical voltage of the battery 40 becomes low.

In the present embodiment, the hinge device 70 includes two T shaped hinged axles used to rotatablely connect the main body 10 with the cover 30.

Figure 6:
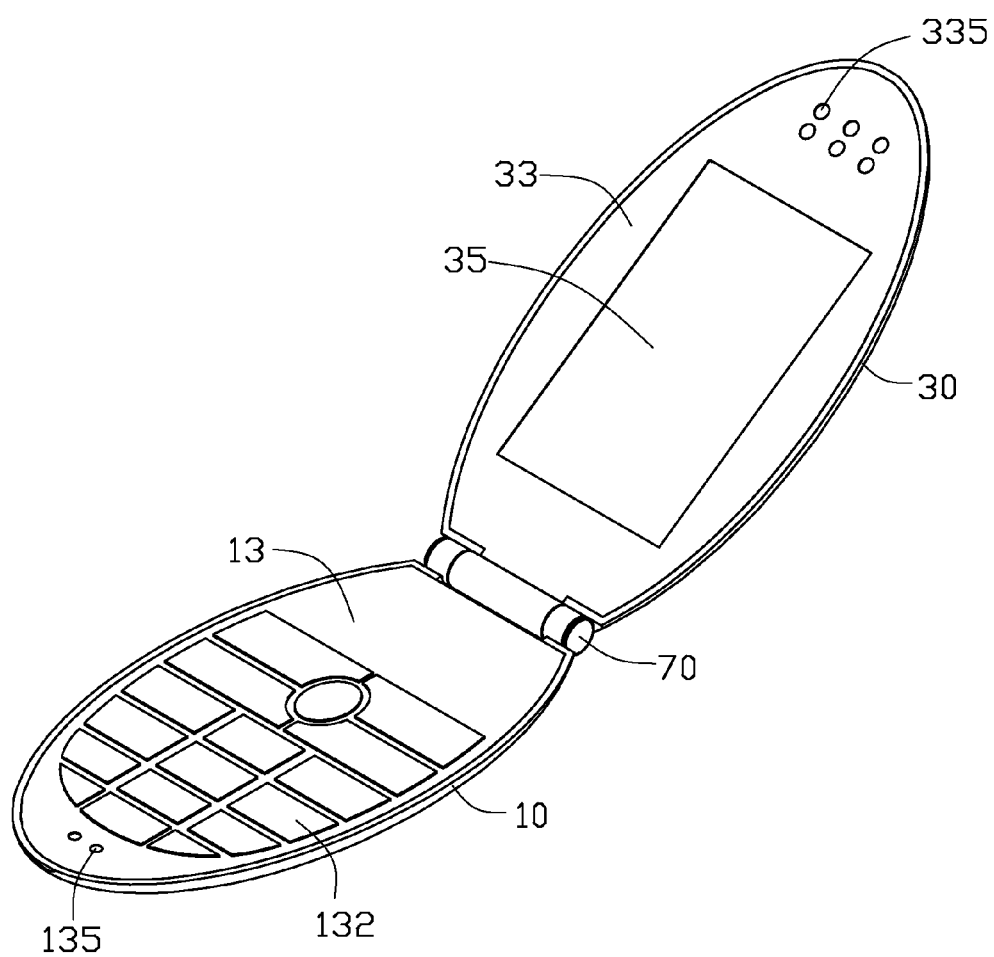
FIG. 6 is a schematic, perspective view of the opened mode of the portable electronic device.

Also referring to FIG. 6, in assembly, the two solar receiving boards 51 are mounted on the outer surface of the lower wall 111 of the lower housing 11 and the outer surface of the upper wall 311 of the upper housing 31, respectively. The two controllers (53) are assembled within the assembling space 110 of the lower housing 11 and the assembling space 310 of the upper housing 31, respectively. The connecting poles 532 of the two controllers 53 penetrate through the through hole 115 and the through hole 315 respectively and electrically connect with the corresponding solar receiving board 51 respectively. The voltage transducer 55 and the accumulator 57 are assembled within the assembling space 110 of the lower housing 11. The voltage transducer 55 is assembled between the accumulator 57 and the controllers 53 and electrically connects with the accumulator 57 and the controllers 53. The battery 40 is assembled within the battery assembling portion 112 of the lower housing 11 and electrically connects with the accumulator 57. The keyboard assembly 13 is mounted on the lower housing 11. The display screen assembly 35 is assembled within the assembling space 310 of the upper housing 31 and resists on the controllers 53. The panel 33 is mounted on the upper housing 31. The display window 332 is mounted on the display screen assembly 35. The hinge axles of the device 70 penetrate through the hinged axial holes 119 of the first hinged portion 117 and the connecting axial through hole 319 to rotatablely connect the main body 10 and the cover 30.

In use, when the portable electronic device 100 is exposed to sunlight, the solar receiving boards 51 of the main body 10 and the cover 30 absorb the sunlight and convert solar energy into electric energy. The two controllers 53 electrically connect with the two solar receiving boards 51 respectively to control the electricity generating device 50. The voltage transducer 55 electrically connects with the two controllers 53 and the accumulator 57, to transduce the voltage of the generated electricity into the suitable voltage for the portable electronic device 100. The accumulator 57 electrically connects with the battery 40 and stores the electricity energy transduced by voltage transducer 55 to automatically charge the battery 40 when the electrical voltage of the battery 40 becomes low.

It is understood that the number of the solar receiving boards 51 are not just limited to two; the number can be increased or decreased.

It is understood that the portable electronic device 100 is not just limited to the flip type portable electronic device, it also can be bar-shaped structure. The solar receiving boards 51 and be mounted on the outer surface of the bar-shaped portable electronic device.

It is to be understood, however, that even though numerous characteristics and advantages of the present invention have been set forth in the foregoing description, with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A portable electronic device comprising:
   a battery assembled within the portable electronic device to supply power; and
   an electricity generating device comprising:
   at least one solar receiving board mounted on an outer surface of the portable electronic device to absorb solar energy and convert solar energy into electric power, the at least one solar receiving board each comprising a silicon single crystal board and an outer surface having a plurality of spaced-apart and parallel raised lines protruding therefrom;
   at least one controller electrically connected with the solar receiving board to control the electricity generating device;
   a voltage transducer electrically connected with the controller to transduce the voltage of the generated electricity into a voltage suitable for operating the portable electronic device; and
   an accumulator electrically connected with the voltage transducer and the battery to store the electric energy and charge the battery when the electrical quantity of the battery becomes low.

2. The portable electronic device as claimed in claim 1, wherein the portable electronic device is a flip-type structure and includes a main body and a cover rotatably connected with the main body; the main body including a lower housing and a keyboard assembly mounted on the lower housing; the controller, the voltage transducer and the accumulator being assembled within the main body under the keyboard assembly.

3. The portable electronic device as claimed in claim 2, wherein the cover includes an upper housing, a panel and a display screen assembly, the panel is mounted on the upper housing; the panel includes a display window disposed thereon; the display screen assembly is assembled within the upper housing corresponding to the display window of the panel.

4. The portable electronic device as claimed in claim 3, wherein the portable electronic device further comprising at least one solar receiving board mounted on the other outer surface of the portable electronic device electrically connecting with the controller, to absorb the solar energy and convert solar energy into electric energy.

5. The portable electronic device as claimed in claim 4, wherein the lower housing includes a first hinged portion disposed thereon, the upper housing disposes a second hinged portion corresponding to the first hinged portion; the portable electronic device further comprising a hinge rotatably connecting the first hinged portion of the lower housing and the second hinged portion of the upper housing.

6. A portable electronic device comprising:
   a main body, the main body including a battery assembling portion recessed therefrom;
   a cover rotatable mounted with the main body;
   a battery being mounted in the main body; and
   an electricity generating device comprising:
   at least one solar receiving board mounted on an outer surface of one of the main body and the cover to absorb solar energy and convert solar energy into electric power;
   at least one controller electrically connected with the solar receiving board to control the electricity generating device;
   a voltage transducer being electrically connected with the controller to transduce the voltage of the generated electricity into a voltage suitable for operating the portable electronic device; and
   an accumulator electrically connected with the voltage transducer and the battery to store the electric energy and charge the battery when the electrical quantity of the battery becomes low.

7. The portable electronic device as claimed in claim 6, wherein the solar receiving board includes a silicon single crystal board.

8. The portable electronic device as claimed in claim 7, wherein the outer surface of the solar receiving board includes a plurality of spaced-apart and parallel raised lines protruding therefrom.

9. The portable electronic device as claimed in claim 8, wherein the main body includes a lower housing and a keyboard assembly mounted on the lower housing; the controller, the voltage transducer and the accumulator being assembled within the main body under the keyboard assembly.

10. The portable electronic device as claimed in claim 9, wherein the cover includes an upper housing, a panel and a display screen assembly, the panel is mounted on the upper housing; the panel includes a display window disposed thereon; the display screen assembly is assembled within the upper housing corresponding to the display window of the panel.

11. The portable electronic device as claimed in claim 10, wherein the portable electronic device further comprising at least one solar receiving board mounted on the other outer surface of the portable electronic device electrically connecting with the controller, to absorb the solar energy and convert solar energy into electric energy.

12. The portable electronic device as claimed in claim 11, wherein the lower housing includes a first hinged portion disposed thereon, the upper housing disposes a second hinged portion corresponding to the first hinged portion; the portable electronic device further comprising a hinge rotatably connecting the first hinged portion of the lower housing and the second hinged portion of the upper housing.

* * * * *